United States Patent [19]

Koziol

[11] Patent Number: 4,679,544
[45] Date of Patent: Jul. 14, 1987

[54] THREADED ADJUSTABLE GAS INTAKE ASSEMBLY

[75] Inventor: Walter Koziol, Antioch, Ill.

[73] Assignee: Modern Home Products Corp., Antioch, Ill.

[21] Appl. No.: 791,315

[22] Filed: Oct. 25, 1985

Related U.S. Application Data

[63] Continuation-in-part of Ser. No. 768,853, Aug. 23, 1985, which is a continuation-in-part of Ser. No. 617,949, Jun. 6, 1984, abandoned, which is a continuation-in-part of Ser. No. 548,723, Nov. 4, 1983, Pat. No. 4,478,205, which is a continuation-in-part of Ser. No. 548,724, Nov. 4, 1983, Pat. No. 4,488,534.

[51] Int. Cl.⁴ .................................. F24B 3/00
[52] U.S. Cl. ......................... 126/41 R; 126/25 R; 126/39 E; 285/226
[58] Field of Search ............. 126/41 R, 25 R, 25 A, 126/25 AA, 30, 39 R, 39 H, 9 B, 39 E; 138/108, 120, 122, 129, 154; 403/299, 166, 229, 343, 118; 431/354, 355; 285/226, 229, 903, 235, 236

[56] References Cited

U.S. PATENT DOCUMENTS

| 370,067 | 9/1887 | Knapp . |
| 741,991 | 10/1903 | Adams . |
| 905,009 | 11/1908 | Shores . |
| 1,325,116 | 12/1919 | Sebille . |
| 1,827,505 | 10/1931 | Bluhm . |
| 2,094,854 | 10/1937 | Smith ................................ 42/55 |
| 2,203,210 | 6/1940 | Young ........................... 239/424.5 |
| 2,218,961 | 10/1940 | Schulz ............................ 126/39 E |
| 2,253,377 | 8/1941 | Jones et al. . |
| 2,257,010 | 9/1941 | Hildebrand . |
| 2,339,477 | 1/1944 | Hess et al. ............................ 158/7 |
| 2,554,708 | 5/1951 | Kosten ............................. 403/229 |
| 2,834,625 | 5/1958 | Stanley et al. .................... 403/343 |
| 3,148,723 | 9/1964 | Farquhar .......................... 158/27.4 |
| 3,289,801 | 12/1966 | Jerkins ............................... 194/3 |
| 3,322,112 | 5/1967 | Huff et al. .......................... 126/41 |
| 3,330,303 | 7/1967 | Fochler ............................ 138/121 |
| 3,332,339 | 7/1967 | Helgeson et al. ................... 99/339 |
| 3,336,950 | 8/1967 | Fochler ............................ 138/121 |
| 3,496,926 | 2/1970 | Kemp et al. . |
| 3,507,069 | 4/1970 | Borba, Jr. ......................... 403/229 |
| 3,638,635 | 2/1972 | Drennan . |
| 3,779,312 | 12/1973 | Withers, Jr. et al. .............. 138/122 |
| 3,838,713 | 10/1974 | Tubbs ............................... 138/121 |
| 3,847,184 | 11/1974 | God .................................. 138/121 |
| 3,878,829 | 4/1975 | Schantz .......................... 126/41 R |
| 3,938,494 | 2/1976 | Clark .............................. 126/41 R |
| 4,020,821 | 5/1977 | Reid, Jr. et al . |
| 4,088,436 | 5/1978 | Alferes .............................. 431/21 |
| 4,092,975 | 6/1978 | Grammatopoulos ............ 126/41 R |
| 4,149,516 | 4/1979 | Hall ................................ 126/41 R |
| 4,267,816 | 5/1981 | Koziol . |
| 4,356,810 | 11/1982 | Ferlin . |
| 4,373,505 | 2/1983 | Koziol ............................. 126/25 R |
| 4,381,758 | 5/1983 | Svekis et al. . |
| 4,462,384 | 7/1984 | Hitch .............................. 126/41 R |
| 4,478,205 | 10/1984 | Koziol ............................ 126/25 R |

FOREIGN PATENT DOCUMENTS

| 2524492 | 12/1976 | Fed. Rep. of Germany .... 126/39 R |
| 811597 | 4/1937 | France ............................ 431/354 |
| 0065837 | 5/1980 | Japan .............................. 126/39 R |
| 17029 | of 1893 | United Kingdom ............... 403/299 |
| 1427342 | 3/1976 | United Kingdom . |

Primary Examiner—Margaret A. Focarino
Assistant Examiner—H. A. Odar
Attorney, Agent, or Firm—Quarles & Brady

[57] ABSTRACT

An adjustable gas intake assembly between the burner element and the gas inlet nozzle for a barbecue grill which can be utilized with various types of gas barbecue grill burners. A venturi tube portion and a supply tube portion are connected by threaded, flexible portions which will provide horizontal or vertical ajustment of the supply tube. The gas intake assembly can be utilized in conjunction with either a front control type barbecue grill unit or a post type. In one embodiment, a slidable tube member provides an additional telescoping section with the threaded, flexible portions.

14 Claims, 16 Drawing Figures

THREADED ADJUSTABLE GAS INTAKE ASSEMBLY

CROSS-REFERENCE TO RELATED APPLICATIONS

This application is a continuation-in-part of application Ser. No. 768,853 filed Aug. 23, 1985 which is a continuation-in-part of application Ser. No. 617,949, now abandoned, filed June 6, 1984 which is a continuation-in-part of application Ser. No. 548,723, U.S. Pat. No. 4,478,205 and which is a continuation-in-part of Ser. No. 548,724, U.S. Pat. No. 4,488,534, both filed Nov. 4, 1983.

BACKGROUND OF THE INVENTION

This invention relates to a gas venturi tube for a burner element in a gas barbecue grill. More particularly, it relates to a flexible and threaded, adjustable gas intake assembly for a gas burner element so that proper connection can be made between the burner element and a gas supply nozzle irrespective of the vertical and/or horizontal distance the burner element is supported from the floor in relation to the gas supply.

Various barbecue grill bases have floors for the burner element located at various positions on the floor and located vertically or horizontally from the gas supply nozzle. Accordingly, it is necessary to construct each gas intake pipe and venturi tube to match the particular distance from the burner element and the gas supply nozzle so that the burner element is in communication with the gas supply pipe. Cost savings could be effected if a venturi tube is fabricated so as to fit in a suitable manner many burner elements in a barbecue base portion and provide proper connection with a gas supply.

The state of the art for gas delivery systems for barbecue grills is illustrated in U.S. Pat. Nos. 3,638,635 and 4,373,505. In U.S. Pat. No. 3,638,635 a one-piece, nonadjustable venturi tube 63 extends from gas valve 70 to burner 25 and is attached thereto by base 65 and screws 63. In U.S. Pat. No. 4,373,505 which is commonly assigned, adjustable securing means such as represented by screw 51 and dimples 50 are provided on the venturi tube 24 and a gas intake tube 55. In German Pat. No. 25 24 492 there is described a gas cooking unit wherein a gas connection can be made with flexible coiled tubes or telescoping tubes. The particular unit is of the range and oven type.

It is an advantage of the present invention to provide a venturi tube or gas intake assembly for a burner in a gas barbecue grill which can operatively provide connection between numerous gas burner elements in grill base floors and a gas intake nozzle which is spaced horizontally or vertically from the burner. It is another advantage of this invention to provide a multi adjustable gas intake assembly which means includes a flexible and threaded section between a gas venturi tube and a burner element which can afford positioning of the burner element at various elevations from the floor as well as being spaced horizontally from the gas supply pipe. It is still another advantage of this invention to provide a secure adjustable gas intake assembly of the foregoing type between a burner element and a gas supply pipe which is easily compressible and expandable in a vertical position in a gas barbecue grill which will provide quick adjustment without leakage. It is yet another advantage of the present invention to provide a dual adjustable gas intake assembly for a gas grill burner element which can be manufactured and assembled in an economical manner. It is still another advantage of this invention to provide horizontal and vertical adjustment between the venturi tube and a gas intake pipe as well as rotatable adjustment between the connecting flange of the venturi assembly and the burner element.

SUMMARY OF THE INVENTION

The foregoing advantages are accomplished by the present adjustable gas intake tube assembly for a gas burner element wherein the burner element has the usual hollow, apertured body member having a portion for receiving a gas intake member. In one embodiment, a first tubular member is defined by a combined flexible and threaded portion. A second tubular member also defines a combined flexible and threaded portion. The flexible and threaded portions of each tubular member are constructed and arranged to threadably engage each other. Air regulator and gas supply inlet means are operatively associated with one of said tubular members and means are operatively associated with the other of the tubular members for connection with a gas burner element. In a preferred embodiment, the air regulator means is of the rotary type with an aperture at the end to receive the gas supply inlet means. The flexible sections can provide a right-angled flexible section or can be employed in a linear vertical manner with some offset. The flexible sections provide both horizontal and vertical adjustment of the tubular members with the burner element. Also in a preferred manner the threaded tubular portions can have threads extending substantially the entire length of the portions. The threaded portions are preferably formed from stainless steel and will be subjected to an annealing process. The annealed stainless steel will have a wall thickness to provide hand flexibility or compression which can be in the range of 0.006 to 0.012 inch. As an alternative embodiment, a tubular additional tubular member has a smooth wall surface and is slidably received in one of the first or second tubular members. In this instance the air regulator means is operatively connected to the smooth walled surface tubular member.

BRIEF DESCRIPTION OF THE DRAWINGS

A better understanding of the present adjustable gas intake assembly for a burner element will be accomplished by reference to the drawings wherein.

DESCRIPTION OF THE PREFERRED EMBODIMENTS

Figures 1, 2, 3:
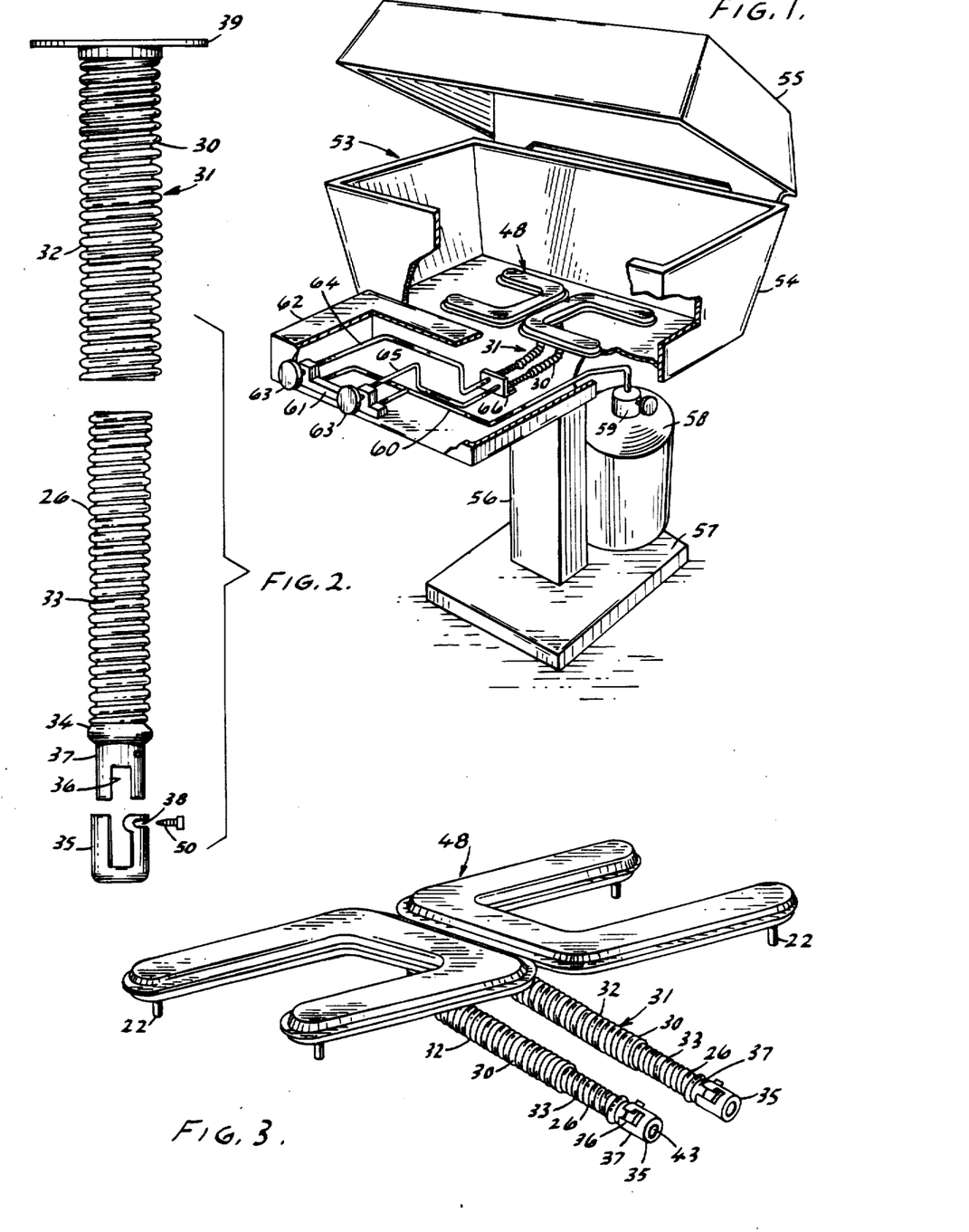
FIG. 1 is a perspective view of a gas barbecue grill unit with portions broken away showing the adjustable venturi tube of this invention and a burner element.
FIG. 2 is a side assembly view depicting the adjustable venturi tube shown in FIG. 1 with a mounting flange for the burner element and prior to one of the venturi tube members being threadably engaged.
FIG. 3 is an enlarged perspective view of the adjustable venturi tube assembly attached to the double burner unit shown in FIG. 1.

Proceeding to a detailed description of the present invention, the novel gas intake assembly generally 31 is shown in FIG. 1 and is especially adapted to be employed for both horizontal and vertical adjustment with the dual burner unit generally 48. The grill unit generally 53 has a base member 54 and will include the usual grate (not shown) over the dual burner element 48 as well as a cover 55. The base 54 is supported and secured to a post 56 which in turn is secured to a foot base 57. A gas supply tank 58 is seated on the base 57 and has a valve 59 which is interconnected to a gas control 61 in the housing 62 equipped with the control knobs 63. The gas feed lines 64 and 65 extend from the gas control 61 as well as through a support bracket 66 where each will be positioned in fluid communication with the dual adjustable venturi or the gas intake assembly generally 31. Each venturi tube assembly in turn is connected with the H-shaped dual burner element 48.

Referring to FIG. 2, two of the tubular members 30 and 26 of the gas intake assembly 31 as shown in FIG. 1 is depicted. Tubular member 30 has a flexible and threaded tubular portion 32 and tubular member 26 has a flexible and threaded, tubular portion 33 as well as a venturi portion 37 for threading into and inside tubular gas intake portion 32. The venturi section 37 has a flanged portion 34 and opposing lateral openings, one of which is shown at 36. The usual rotatable regulator 35 is adapted to be secured to venturi section 37 by the usual slot 38 and screw 50 which will be threaded into aperture 43.

Figures 9, 10:
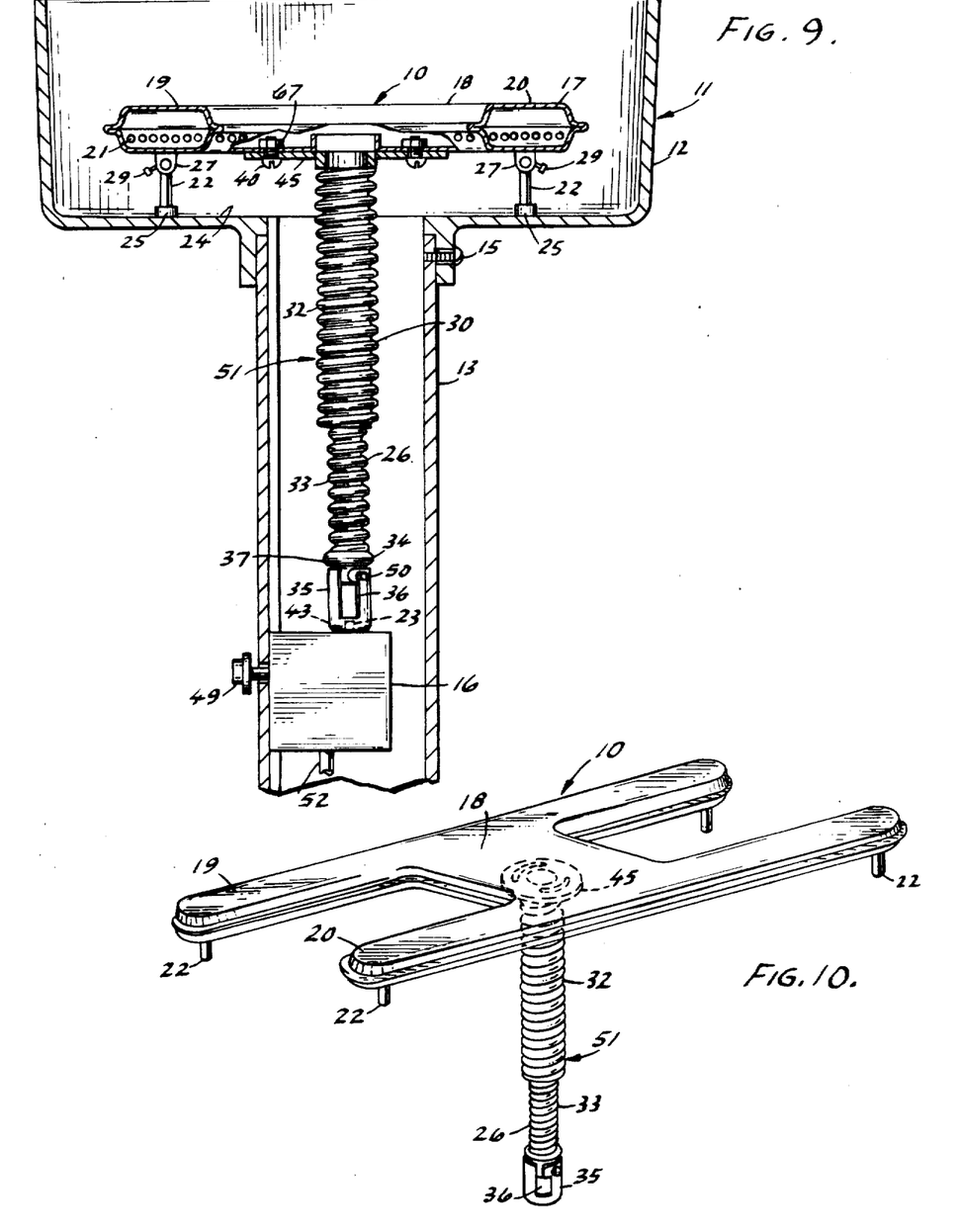
FIG. 9 is a view in vertical section of an alternative grill unit showing still another alternative embodiment of a gas intake assembly of this invention.
FIG. 10 is a view in top perspective showing the gas intake assembly of FIG. 9 removed from the grill unit.

FIG. 3 represents the gas intake assembly 31 and the dual burner element 48 apart from the grill unit 53. It will be seen that two tubular members 30 are secured to the burner element 48 such as by the flange 39 (See FIG. 2). Leg members 22 extend from the burner element 48 and will be later discussed. Two tubular members 26 will be threadably received in the flexible and threaded gas intake portions 32. Apertures or openings 43 are disposed in the rotatable air regulators 35 for reception of a gas nozzle or orifice 23, such as shown in FIG. 9. These provide a gas supply inlet means.

Figure 4:
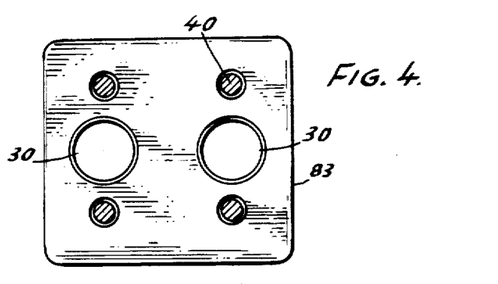
FIG. 4 is a top plan view of a mounting flange for attachment of the gas intake assemblies of this invention to a double burner unit.
Figure 5:
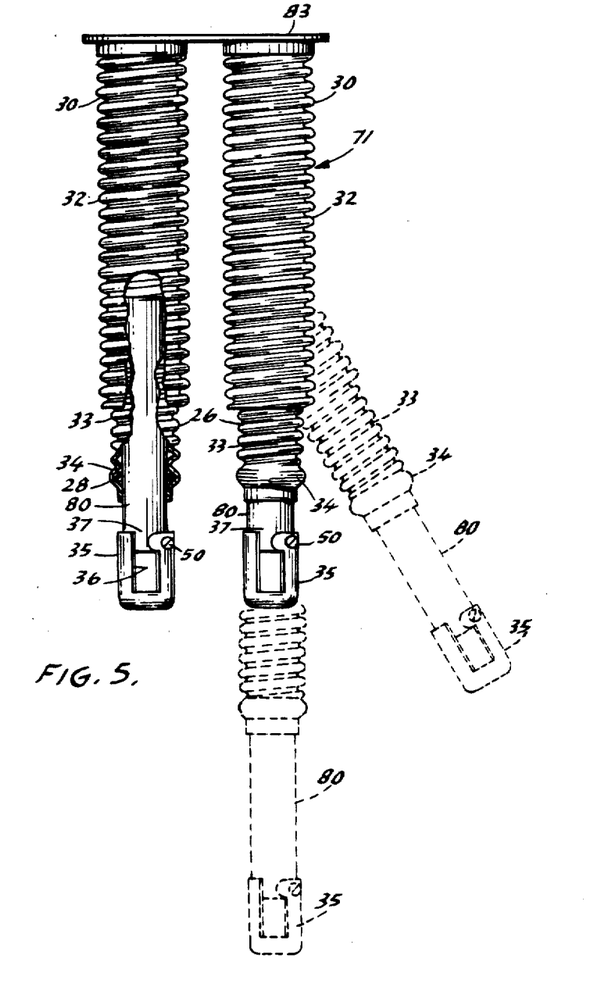
FIG. 5 is a view in side elevation illustrating an alternative embodiment of a gas intake assembly of this invention.

FIGS. 4 and 5 represent an adjustable dual gas intake or venturi assembly 71 with tubular components similar to gas intake assembly 31. Accordingly, similar parts are indicated by similar numbers. The tubular members 30 are interconnected by the flange or bracket 83 which in turn can be connected to the burner element 48 by the screws 40. The difference between gas intake assembly 31 and 71 is that adjustable venturi assembly 71 has the sidable tubular extension 80 with the rotatable regulator 35 attached thereto as well as the lateral opening 36. This will provide a venturi section 37. Tubular extension 80 will be slidably received in the threaded flexible tubular portion 33 adjacent The flanged portion 34 which can contain a seal washer 28. the flanged portion 34 and the washer 28 are optional and can be eliminated without affecting the performance of the assembly 71.

Figure 6:
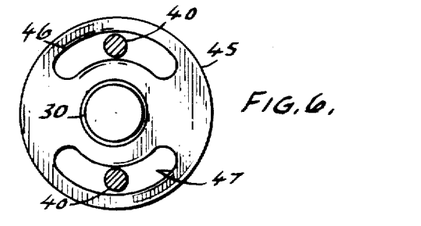
FIG. 6 is a view similar to FIG. 4 showing an alternative mounting flange for a single adjustable gas intake assembly.
Figure 7:
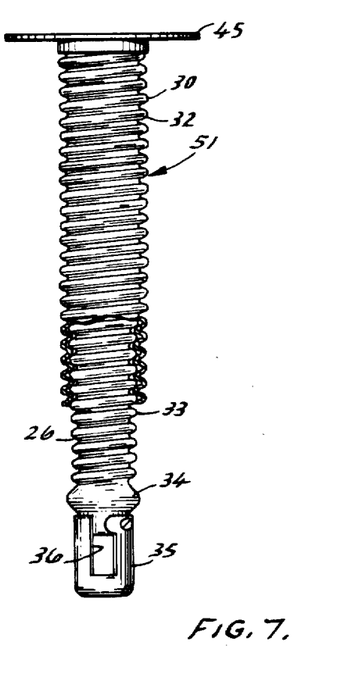
FIG. 7 is a view in side elevation and partially broken away of the assembled gas intake assembly shown in FIG. 1.
Figure 8:
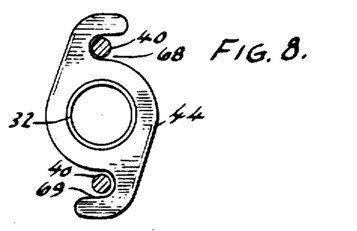
FIG. 8 is a view similar to FIG. 6 showing yet another alternative embodiment of a mounting bracket.

Referring to FIGS. 6 and 7, gas intake assembly generally 51 is depicted and is similar to gas intake assembly 31 except that it has only two tubular members 30 secured to a burner mounting flange 45. Arcuate slots 46 and 47 will afford attachment to the burner by the screws 40. Shown in FIG. 8 is a different type of mounting flange 44 having open slots 68 and 69 for the mounting screws 40. The same component parts as described in conjunction with venturi tube assembly 31 are designated by the same numbers.

Referring to FIGS. 9 and 10, the gas intake assembly generally 51 is shown utilized in conjunction with the gas barbecue grill unit generally 11 of the post type. The grill unit 11 has the burner element generally 10 and the usual base member 12. It will include the usual grate and cover (not shown) placed over the burner 10. The base 12 is supported and secured by the normal post 13 by means of a flange 14 and a screw 15. A post 13 will carry a gas control 16 and have an air vent (not shown). It will be noted that the burner element 10 is formed from a hollow body member 17 having a central portion 18 and four arm portions, two of which are shown at 19 and 20, resulting in and H-shaped configuration with apertures 21. Extending from each arm portion is a leg member such as 22, which is positioned near the end of the arm portions and in the direction of the floor 24. The leg members 22 are pivotally and extendably secured to the bottom of the arm portions 19 and 20 and will contact the foot pads such as 25 on floor 24 of the base member 12. The leg members 22 are slidably positioned in the tubular portions 27 and fastened by the screws 29. They are described in more detail in U.S. Pat. No. 4,267,816 by the same inventor. The burner element 10 communicates with the novel venturi tube assembly generally 51 having a gas intake tubular member 30 with the threaded portion 32 and a venturi tube member 26 with a venturi section 37 and the threaded portion 33. The rotatable air regulator 35 is slidably disposed at one end of the tubular member 26 as indicated in conjunction with venturi assembly 31 and has the adjustable lateral opening 36 the size of which is controlled by the regulator 35. The venturi tube assembly 51 is positioned on a control 16 by means of the air regulator 35 in the form of a rotatble collar. The usual slot and the screw 50 are disposed in the air regulator 35 for air adjustment. A gas supply orifice 23 fed by a gas supply line 52 is centered in an opening such as 43 provided by the tubular member 26 and the air regulator 35 (See FIG. 3). At the opposite end, the venturi assembly gas intake tubular member 30 is operatively connected to the burner element 10 by means of a flange 45 and the screws 40 and nuts 67 with the flange 45 exending from the intake tubular member 30.

Figure 11:
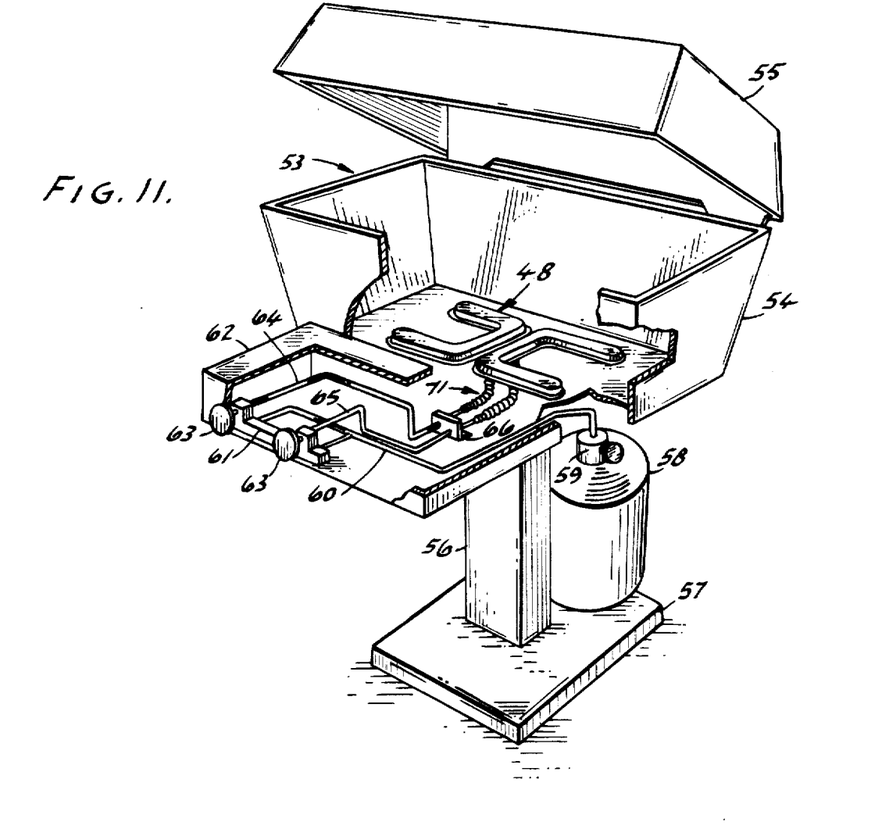
FIG. 11 is a view similar to FIG. 1 showing yet another alternative embodiment of a gas intake assembly of this invention.
Figure 12:
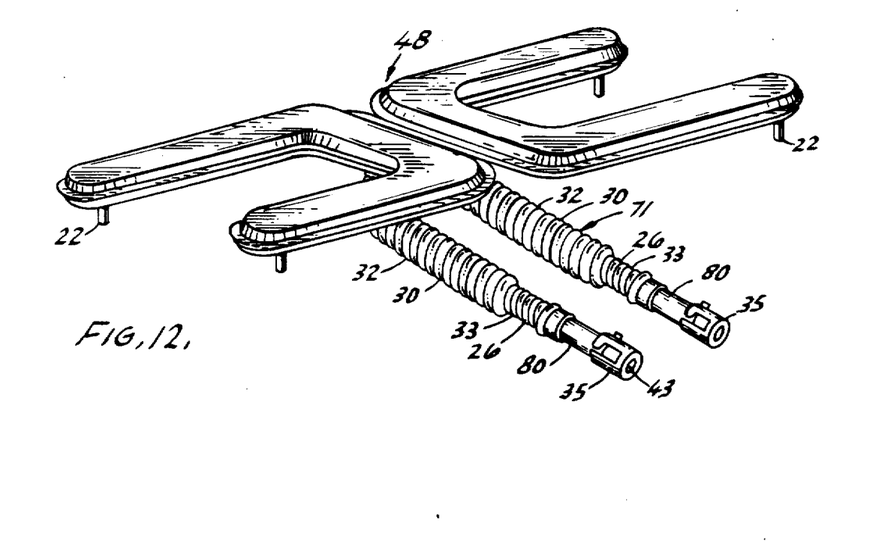
FIG. 12 is a view in top perspective showing the gas intake assembly of FIG. 11 removed from the grill unit.

FIGS. 11 and 12 illustrate a gas intake assembly generally 71 in the grill unit 53 which was earlier described. Accordingly, similar parts are indicated by similar numbers. It will be seen that there will be an elbow type bending of the tubular members 30 and an extension of the slidable extensions 80.

Figures 13, 14:
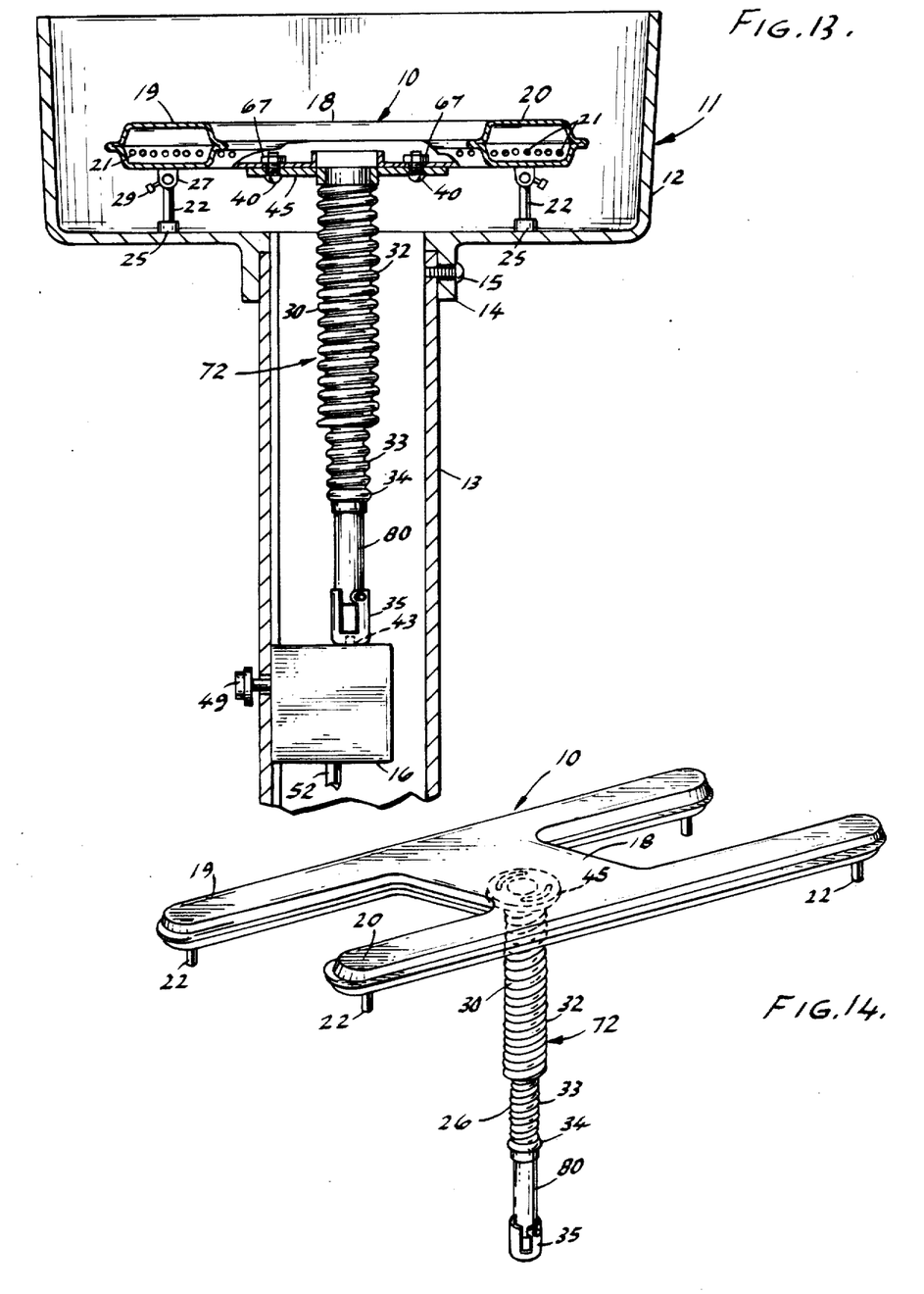
FIG. 13 is a view similar to FIG. 9 showing still another embodiment of the gas intake assembly of this invention.
FIG. 14 is a view in top perspective showing the gas intake assembly of FIG. 13 removed from the grill unit.

FIGS. 13 and 14 depict a venturi assembly generally 72 similar to assemblies 51 and 72. It is shown in conjunction with the previously described grill unit 11. Similarly to venturi assembly 71, it has the slidable, telescoping tube 80 for reception inside the tubular portion 33. In a manner similar to assembly 51 it has a single venturi unit with the tubular members 30 and 26.

Figures 15, 16:
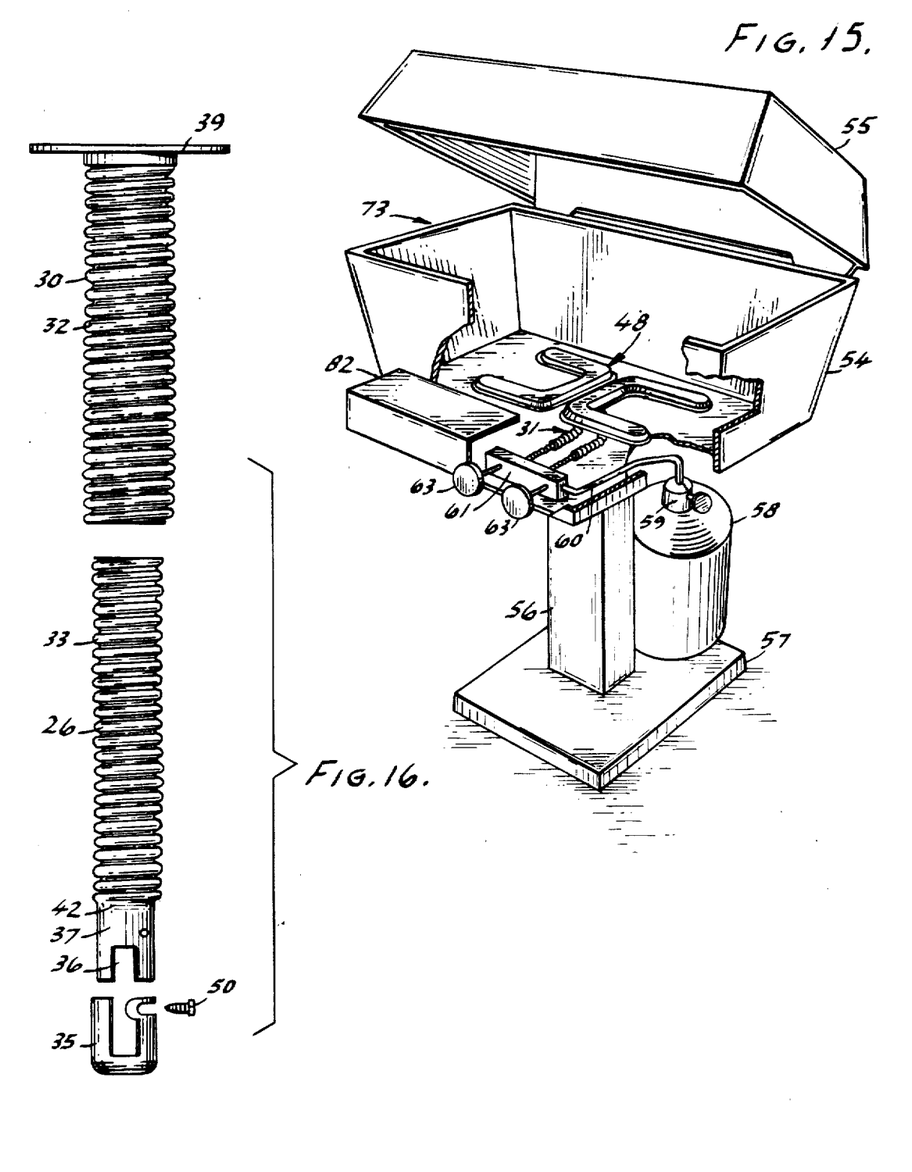
FIG. 15 is a view similar to FIG. 1 illustrating yet another grill unit for use with a gas intake assembly of this invention.
FIG. 16 is a view similar to FIG. 2 showing still another embodiment of a gas intake assembly of this invention.

FIG. 15 is presented for the purpose of showing the venturi assembly 31 in conjunction with a modified front panel type grill unit 72 which is similar to grill unit 53. Similar parts are designated by similar numbers. The major difference between the two grill units is in a shorter front panel section 82. Accordingly the control valves 74 and 75 of the gas control 61 are moved in closer proximity to the venturi assembly 31 and gas feed lines 64 and 65 as well as bracket 66 is eliminated.

In FIG. 16 there is shown a modified gas intake assembly 41 which is similar to venturi assembly 31 except that the hollow flange portion 34 of assembly 31 has been eliminated. As a result, a smooth walled portion 42 results between the flexible tubular portion 33 and the lateral opening 36. In all other respects the assemblies are the same as indicated by the same reference numerals indicating the same components.

An important aspect of this invention is the fact that multiple adjustments between gas burners such as 48 and 10 and the gas feed lines 64 and 65 or the gas control 61 which will have the usual nozzle portions such as 23 at the end thereof can be effected.

When it is desired to assemble venturi assembly 31, the flange 39 will be secured to the burner 48 such as with the screws 40 (See FIGS. 4 and 9 with respect to burner 10 and flange 45). Referring specifically to FIG. 2, threaded portion 33 of tubular member 26 may have previously been threaded into the threaded portion 32 of gas intake tubular member 30. Burner 48 will be suitably positioned in base member 54. Gas intake tubular member or portion 30 will be bent or flexed into an elbow like manner such as indicated in FIG. 1. The next adjustment is the alignment of the venturi tubular member or portion 26 and the gas nozzles which will be fastened on the inside of the support bracket 66. This is effected by turning the threaded tubular portion 33 into or out of the threaded portion 32 of the gas intake portion 30. It will be appreciated that any additional alignment between the burner 48 and the gas nozzles is easily effected by deflective movement of either or both of the flexible gas intake portions 30 and venturi tubular portions 26.

When it is desired to assemble the venturi assembly 51, the flange 45 will be fastened to burner 10 by the screws 40 and nuts 67. The venturi portion 33 will be placed over the gas supply nozzle 23 and legs such as 22 suitably adjusted to sit on the foot pads 25. It will be appreciated that any adjustment in height between nozzle 23 and the burner 10 as resting on the foot pads 25 is easily compensated for as flexible tubular member 26 can be threaded into and out of gas intake portion 30 for height adjustment. In addition, any axial deviation can be compensated for by lateral deflection of either or both flexible tubular members 30 and 26.

Adjustable venturi assembly 71 with the burner element 48, will be assembled in grill unit 53 in the same manner as assembly 31. The additional advantage of this assembly 71 is that additional horizontal adjustment between the inlet nozzles and the burner 48 is afforded by the telescoping tubular extension 80.

Similarly, adjustable venturi assembly 72 can be assembled and adjusted in somewhat the same manner as venturi assembly 51. Again, the added adjustment is provided by the smooth walled slidable tubular member 80. Any additional vertical height adjustment is effected by this tubular member 80 which can be moved into and out of tubular portion 80. Any vertical deviation between nozzle 23 and the central connection with burner 10 through flange 45 is easily compensated for by deflecting either or both flexible gas intake portion 30 or flexible tubular portion 33.

Venturi assembly 31 with dual venturi tubular units is shown in conjunction with gas grill unit 53. If desired, venturi assembly 51 with a single venturi unit could be employed in a grill unit 53 in the above indicated manner with a single burner unit such as 10. To further assist in the connection of single tube venturi assembly 51, flanges 44 or 45 could be utilized. Flange 44 has the advantage of the open slots 68 and 69 whereas flagne 45 affords the same rotational adjustment by the arcuate slots 46 and 47.

Gas-fired grill units 11 and 53 are made of case aluminum whereas the burner elements 10 and 48 are manufactured from stainless steel. Flexible and threaded tubular members 30 and 26 are fabricated from RF stainless steel and are annealed. However, other heat resistant materials such as aluminum, copper or plastic could be employed. The threads forming the threaded portions 32 and 33 have a pitch of 0.140 inch. The threads forming threaded portion 32 has a width of 0.090 inch whereas for threaded portion 33 it is 0.065 inch. The inside major diameter for threaded portion 32 is 0.695 inch and the inside minor diameter is 0.515 inch. The outside major diameter of threaded portion 33 is 0.690 inch whereas the outside minor diameter is 0.510 inch. It will be appreciated that the terms "outside" and "inside" refer to the fact that tubular member 26 fits inside tubular member 30. The wall thickness for the threaded portions 32 and 33 can range from 0.004 to 0.012 inch. Also preferably the threads forming threaded portions 32 and 33 will have multiplicity of convolutions per inch and eight such convolutions per inch has been found to work well. In the instance of venturi section 37 and slidable tubular extension 80, these are also made from steel and are usually chromeplated.

While the screws 40 and nuts 67 have been indicated as a preferred means for securing flanges 39, 44 and 45 to burners 10 and 48, screws alone could be used. While burners 10 and 48 are shown as H or U-shaped in configuration, it will be appreciated that the adjustable venturi tube assemblies of this invention could be utilized with any configuration of burner, as indicated by burner 48, and can be of a straight tube, star-shaped or figure eight variety. Also, while the gas supply tubes and orifices have been indicated for connection through an air regulator or shutter 35, obviously various types of connections can be made with the gas supply tube and the venturi tube assemblies. Neither is it necessary that flexible and threaded gas intake assembly be utilized with a rotatable air regulator 35. Any air regulator could be employed such as one that has a preset or prefixed opening. While certain types of gas fired grill units have been shown in conjunction with the gas intake assembly, it is obvious that it can be utilized in any gas grill unit whether of the permanent built-in type such as supported between permanent support walls or from a post, or of the portable type such as mounted on wheels or on a movable stand. Further, any type of hydrocarbon fuel gas such as natural gas, propane and butane can utilize the adjustable features of venturi assemblies of this invention.

It will thus be seen that in the present invention there is now provided an adjustable venturi assembly which is fabricated to fit numerous types of gas barbecue grills irrespective of the vertical or horizontal space differences between the burner element and the gas supply means. Not only is horizontal or vertical adjustment afforded but also radial adjustment as well. The various adjustments of the venturi tube and gas supply tubes are easily effected by means of threaded engagement between flexible tubular portions as well as compression or expansion of these flexible tube portions. These adjustments can be employed alone or in conjunction with slidable tubular extensions. All of these adjustment features can be utilized with adjustable leg members to afford adjustment of the burner and the venturi tubular member. The adjustable venturi assemblies are advantageously employed in conjunction with gas barbecue grill units where only vertical adjustment is required between the burner and its source of gas or where the gas supply is positioned at right angles to the burner element. Additionally, the venturi tube assemblies provide for sturdy placement of the burner in the grill units. The multi-adjustable gas intake assembly is easily packaged with the burner element to which is to be subsequently attached in the grill unit.

The foregoing invention can now be practiced by those skilled in the art. Such skilled persons will know that the invention is not necessarily restricted to the particular embodiments presented herein. The scope of the invention is to be defined by terms of the following claims as given meaning by the preceding description.

I claim:

1. A multi-adjustable gas intake assembly for a gas burner element which can provide connection between varying position of gas controls and gas burners including both vertical and horizontal adjustment comprising:
   a first tubular gas conveying member defining a combined flexible and threaded portion;
   a second tubular gas conveying member defining a combined flexible and threaded portion, said flexible and threaded portions of said first and second tubular members constructed and arranged to threadably engage each other, at least one of said first and second tubular members being freely movable in a threaded manner with respect to the other and vertically and horizontally adjustable;
   air regulator and gas supply inlet means on one of said tubular members
   said air regulator and gas supply inlet means including an opening into said tubular member to effect mixing of gas and air;
   and
   means operatively associated with the other of said tubular members for connection with a gas burner element.

2. A multi-adjustable gas intake assembly for a gas grill burner element which can provide connection between varying positions of gas controls and gas burners including both vertical and horizontal adjustment comprising:
   a first tubular gas conveying member defining a combined flexible and threaded portion;
   air regulator means on said first tubular member;
   an opening defined by said first tubular member to receive a gas supply means,
   said air regulator means and said gas supply means and said opening effect the mixing of gas and air;
   a second tubular gas conveying member defining a combined flexible and threaded portion, said flexible and threaded portions of said first and second tubular members constructed and arranged to threadably engage each other, at least one of said first and second tubular members being freely movable in a threaded manner with respect to the other and vertically and horizontally adjustable;
   and
   means operatively associated with said second tubular member for connection with a gas burner element.

3. The multi-adjustable gas intake assembly as defined in claim 2 wherein said air regulator is defined by a lateral aperture extending through said first tubular portion and an air regulator member slidably received by said tubular portion to controllably cover said lateral aperture.

4. The multi-adjustable gas intake assembly as defined in claim 3 wherein said air regulator member includes an opening for receiving said gas supply means.

5. The multi-adjustable gas intake assembly as defined in claim 2 wherein threaded portion extends substantially the entire length of said first and second tubular portions except for a section accommodating said air regulator means.

6. The multi-adjustable gas intake assembly as defined in claim 2 wherein said first and second tubular members are comprised of a flexible heat resistant material.

7. The multi-adjustable gas intake assembly as defined in claim 6 wherein said threadably engageable portions include helical threads having a multiplicity of convolutions per inch.

8. The multi-adjustable gas intake assembly as defined in claim 2 wherein at least one additional first and second tubular member are present to provide a dual unit joined by a common bracket member.

9. A multi-adjustable gas grill burner assembly which can provide connection between varying positions of gas controls and gas burners including both vertical and horizontal adjustment comprising:
   a first tubular gas conveying member defining a smooth wall surface;
   an air regulator means on said first tubular member;
   an opening defined by said first tubular member to receive a gas supply means
   said air regulator means, said gas supply means and said opening effect the mixing of gas and air;
   a second tubular gas conveying member defining a combined flexible and threaded portion;
   a third tubular gas conveying member having a flexible section, said flexible and threaded portions of said second and third tubular members constructed and arranged to threadably engage each other, at least one of said second and third tubular members being freely movable in a threaded manner with respect to the other and vertically and horizontally adjustable;

said first tubular member adapted to be slidably received within one of said second or third tubular members; and means operatively associated with one of said other second or third tubular members for connection with a gas burner element.

10. The multi-adjustable gas intake assembly as defined in claim 9 wherein at least one additional first and second tubular member are present to provide a dual unit joined by a common bracket member.

11. An improved gas burner assembly or a gas barbecue grill having a floor to support a burner element which can provide connection between varying positions of gas controls and gas burners including both vertical and horizontal adjustment comprising:

a burner element;

a first tubular gas conveying member defining a combined flexible and threaded portion;

a second tubular gas conveying member defining a combined flexible and threaded portion, said flexible and threaded portions of said first and second tubular members constructed and arranged to threadably engage each other, at least one of said first and second tubular members being freely movable in a threaded manner with respect to the other and vertically and horizontally adjustable;

air regulator and gas supply inlet means on one of said tubular members said air regulator and gas supply inlet means including an opening into said tubular member to effect mixing of gas and air; and means operatively associated with the other of said tubular members for connection with said burner element.

12. The improved gas burner assembly of claim 11 further including leg members extending from said burner element for contact with said barbecue grill floor.

13. The improved gas burner assembly of claim 11 wherein said burner element is constructed to be placed in a grill unit of a post type.

14. The improved gas burner assembly of claim 11 wherein said burner element is constructed to be placed in a grill unit of a front control type.

* * * * *

UNITED STATES PATENT AND TRADEMARK OFFICE
CERTIFICATE OF CORRECTION

PATENT NO. : 4,679,544

DATED : July 14, 1987

INVENTOR(S) : Koziol

It is certified that error appears in the above-identified patent and that said Letters Patent is hereby corrected as shown below:

| | |
|---|---|
| Column 4, line 11 | "sidable" should read --slidable-- |
| Column 4, line 15 | "The" should read --the-- |
| Column 4, line 62 | "rotatble" should read --rotatable-- |
| Column 5, line 19 | "72" should read --73-- |
| Column 6, line 27 | "flagne" should read --flange-- |
| Column 6, line 30 | "case" should read --cast-- |
| Column 7, line 46 (Claim 1) | "position" should read --positions-- |
| Column 9, line 11 (Claim 11) | "or" should read --for-- |

Signed and Sealed this

Twenty-eighth Day of June, 1988

Attest:

DONALD J. QUIGG

*Attesting Officer*  *Commissioner of Patents and Trademarks*